Nov. 24, 1931.  H. SYNCK  1,833,137
PLANT LIFTER FOR CORN PICKING MACHINES
Filed March 5, 1929
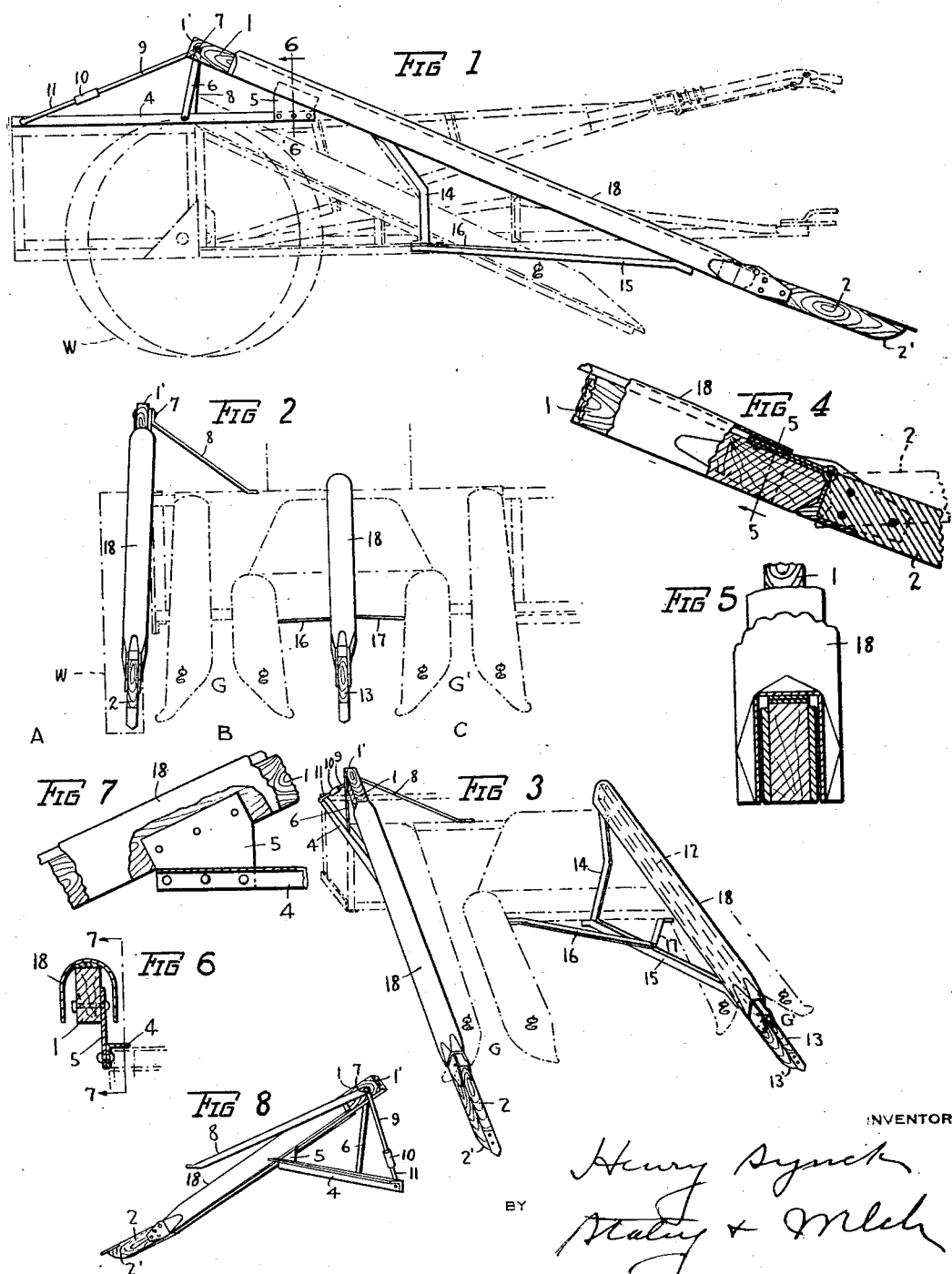
INVENTOR
Henry Synck
BY
ATTORNEYS Patented Nov. 24, 1931

1,833,137

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

PLANT LIFTER FOR CORN PICKING MACHINES

Application filed March 5, 1929. Serial No. 344,176.

This invention relates to plant lifters, it more particularly relating to an appliance for corn picking machines adapted to lift down corn.

The object of my invention is to provide an appliance with which corn picking machines may be readily equipped for the purpose of lifting or turning down corn stalks in advance of the usual gathering mechanism of the machines whereby all of the stalks will be properly gathered into the throat of the gathering mechanism, or turned out of the path of the machine to prevent injury thereto.

In the accompanying drawings:

Fig. 1 is a side elevation of my improved corn lifting attachment shown attached to a corn picker machine.

Fig. 2 is a front elevation of the same.

Fig. 3 is a front perspective view.

Fig. 4 is an enlarged elevation, partly in longitudinal section, of a portion of the device.

Fig. 5 is an enlarged section of the line 5—5 of Fig. 4.

Fig. 6 is a vertical section on the line 6—6 of Fig. 1, somewhat enlarged in scale.

Fig. 7 is an enlarged vertical section on the line 7—7 of Fig. 6.

Fig. 8 is a perspective view in reduced scale, of a portion of the improved device.

In the present instance, the improved corn lifter is shown attached to a corn picking machine of the two-row type, in which there are two pairs of gathering mechanisms, shown conventionally at G and G', each mechanism consisting of the usual downwardly inclined members g which form a converging throat that receives a row of corn stalks, and also has the usual gathering chains and snapping rolls (not shown in the present instance). It will be noticed in Fig. 2 that one lifting device is secured to the machine between the gathering units G and G'; the function of this device is principally to lift the corn in rows B and C, while the other device which is secured to the end of the frame assists in lifting the corn in row B, and also in lifting and turning the corn in row A to avoid damage to the same, since it may be lying in the path of the wheel W. The two devices are practically alike in design and construction, there being only slight necessary differences in the manner in which they are secured to the machine itself.

Referring to the drawings, particularly to Fig. 1, 1 is a beam, in the present case, of wood, supported by the picker frame in such manner that it extends downwardly and forwardly, having an extension member 2 hinged thereto, and which, when the machine is lowered to its operative position, will be in such angular relation to the machine that the curved end 2' of the extension 2 will be held near the ground well in advance of the gathering members g, and the upper end 1' of the beam supported above the approximate center of the wheel W, the beam 1 being substantially located in the plane of the wheel W.

The support for the beam 1 consists of, in the present case, a bar 4 of angle section secured to an upper longitudinal frame-end member, the bar 4 projecting forwardly for a distance. To the vertical leg of the angle bar 4 is secured a plate 5 to which the beam 1 is secured. The beam 1 is further secured by a plurality of brace members, there being a vertical bar 6 secured at its lower end to the bar 4, and whose upper end is bolted to the beam 1 by a bolt 7, and a diagonal brace bar 8 also secured by a bolt 7 at its upper end, its lower end being attached to the upper forward frame member, and an adjustable diagonal rearwardly extending brace comprising a rod 9 secured by bolt 7, a turn buckle 10, and a rod 11 secured at its lower end to the bar 4. The rods 9 and 11 are properly threaded at the ends adjacent the turn buckle 10 so that rotation of the turn buckle will provide an adjustment by which rigidity of the support is maintained, while by proper positioning of the beam relative to the plate 5 the proper height of the end 2' of the extension 2 relative to the ground will be obtained.

The lifting device to be attached and operated at the center of the gathering units G and G' is similar to the device just described, having a beam 12, a hinged extension 13, both extended forwardly and downwardly, the curved end 13' being supported near the ground when the machine is in operative position, and a desired distance in advance of the points of the gathering members. The supporting arrangement for the beam 12 consists of a vertical bar 14 secured at its upper end to the beam 12, and its lower end to a transverse forward frame member. A forwardly extending horizontal member 15 supports the forward portion of the beam 12, being secured to the forward frame member and to the beam, while a pair of diagonal horizontal braces 16 and 17 complete the structure, they being attached to the forward frame member at their rearward ends and having their forward ends secured to the member 15, as best shown in Fig. 3. Each of the beams 1 and 12 is preferably enclosed with a sheet metal cover 18.

By this appliance down corn stalks may be readily and effectively lifted to a position whereby they will properly enter the throats of the gathering members of the corn picking machine or be lifted entirely out of the way of the machine. In this connection it should be explained that the corn picking machine is drawn by a tractor and that the tractor itself is equipped with lifting devices which will lift those stalks in row C which lean to the right as viewed in Fig. 2, such a lifting device being shown in my pending application Serial No. 344,177 filed March 5, 1929. The appliance is of such a nature as will permit it to be readily installed as an attachment on existing corn picking machines or to be built into new machines as a permanent part thereof.

Having thus described my invention, I claim:

1. In a corn picking machine, the combination, with the inclined throat members of a gathering mechanism, of a corn lifter device comprising a beam extending downwardly and forwardly, means for rigidly connecting the rear end of said beam to the frame of the machine leaving its forward end unencumbered by securing devices, and an extension member freely hinged to the forward end of said beam so as to swing upwardly and adapted to run in proximity to the ground line.

2. In a corn picker machine, the combination of two sets of members each forming the throat of a gathering mechanism, of a lifting device supported by the machine between said sets of members and extending forwardly thereof, with its lower end in proximity to the ground line.

3. In a corn picker machine, the combination of two side-by-side sets of inclined members, each set forming the throat of a gathering mechanism, a corn lifting device arranged between said sets of members, another corn lifting device arranged in proximity to the outer side of the outermost throat member, each of said lifting devices extending downwardly and forwardly with its lower end in proximity to the ground line in advance of said inclined members.

In testimony whereof, I have hereunto set my hand this 15th day of February, 1929.

HENRY SYNCK.